(12) United States Patent
Halley et al.

(10) Patent No.: US 11,025,584 B2
(45) Date of Patent: *Jun. 1, 2021

(54) CLIENT SUBNET EFFICIENCY BY EQUIVALENCE CLASS AGGREGATION

(71) Applicant: Akamai Technologies Inc., Cambridge, MA (US)

(72) Inventors: Robert Thomas Halley, Redwood City, CA (US); Brian Wellington, Union City, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,508

(22) Filed: May 13, 2020

(65) Prior Publication Data
US 2020/0382465 A1    Dec. 3, 2020

Related U.S. Application Data

(63) Continuation of application No. 16/102,947, filed on Aug. 14, 2018, now Pat. No. 10,693,834, which is a
(Continued)

(51) Int. Cl.
*H04L 29/12* (2006.01)
*H04L 29/08* (2006.01)

(52) U.S. Cl.
CPC ...... *H04L 61/1511* (2013.01); *H04L 61/2007* (2013.01); *H04L 67/2842* (2013.01); *H04L 61/6009* (2013.01); *H04L 61/6095* (2013.01)

(58) Field of Classification Search
CPC ............. H04L 61/1511; H04L 61/2007; H04L 67/2842; H04L 61/6095; H04L 61/6009
See application file for complete search history.

(56) References Cited

U.S. PATENT DOCUMENTS

| 7,020,698 B2 * | 3/2006 | Andrews ........... H04L 29/12066 709/203 |
| 7,991,910 B2 * | 8/2011 | Richardson ........... H04W 4/029 709/238 |

(Continued)

OTHER PUBLICATIONS

V. Fuller et al., Request for Comments (RFC) 4632: Classless Inter-domain Routing (CIDR): The Internet Address Assignment and Aggregation Plan, Internet Engineering Task Force (IETF), Network Working Group, Internet Society, pp. 1-27, Aug. 2006. (Year: 2006).*

(Continued)

*Primary Examiner* — Patrice L Winder

(57) ABSTRACT

A method for improving client subnet efficiency by equivalence class aggregation includes receiving a Domain Name System (DNS) query from a client, determining, based on predetermined class criteria, that the client is associated with an equivalency class, searching a cache associated with the equivalence class for an answer corresponding to the DNS query, and upon locating the answer, serving the answer to the client. Membership in equivalence classes can be adjusted, tuned, or otherwise modified based upon one or more criteria or rules. The adjustment of memberships may be a necessary step in response to changing network conditions. A membership in one or more equivalence classes can be adjusted based on determining changes in service (such as changes in bandwidth, quality of service, client location, and so forth), and/or based on detection of a modification to the network topology, and/or based on received input concerning performance.

9 Claims, 5 Drawing Sheets

Related U.S. Application Data continuation of application No. 14/883,261, filed on Oct. 14, 2015, now Pat. No. 10,079,800.

(56) References Cited

U.S. PATENT DOCUMENTS

| | | | | |
|---|---|---|---|---|
| 8,234,403 | B2* | 7/2012 | Richardson | H04L 61/609 709/238 |
| 8,447,856 | B2* | 5/2013 | Drako | H04L 61/1511 709/225 |
| 8,606,926 | B2* | 12/2013 | Ulevitch | H04L 61/1552 709/227 |
| 8,676,989 | B2* | 3/2014 | Treuhaft | H04L 61/35 709/227 |
| 9,043,463 | B1* | 5/2015 | Cohn | H04L 67/16 709/225 |
| 9,166,947 | B1* | 10/2015 | Tian | G06F 9/45558 |
| 9,497,159 | B2* | 11/2016 | Bazin | H04L 61/6068 |
| 9,544,228 | B2* | 1/2017 | Cheng | H04L 45/741 |
| 9,548,874 | B2* | 1/2017 | Joe | H04L 61/1511 |
| 9,736,185 | B1* | 8/2017 | Belamaric | H04L 61/1511 |
| 9,900,402 | B1* | 2/2018 | Li | H04L 41/0896 |
| 9,917,905 | B2* | 3/2018 | Amishav | H04L 41/5058 |
| 10,015,094 | B1* | 7/2018 | Akers | H04L 61/6068 |
| 10,079,800 | B2 | 9/2018 | Halley et al. | |
| 10,320,628 | B2* | 6/2019 | Wan | H04L 61/1511 |
| 2007/0294419 | A1* | 12/2007 | Ulevitch | H04L 61/1552 709/230 |
| 2008/0288470 | A1* | 11/2008 | Goutard | H04L 29/12009 |
| 2010/0306409 | A1* | 12/2010 | Jansen | H04L 29/12113 709/245 |
| 2012/0066408 | A1* | 3/2012 | Richardson | H04L 61/609 709/238 |
| 2012/0254996 | A1* | 10/2012 | Wilbourn | H04L 61/6009 726/22 |
| 2013/0205045 | A1* | 8/2013 | Richardson | H04L 69/40 709/245 |
| 2013/0268633 | A1* | 10/2013 | Richardson | H04L 45/741 709/219 |
| 2014/0337526 | A1* | 11/2014 | Amishav | H04L 67/16 709/225 |
| 2015/0172415 | A1* | 6/2015 | Richardson | H04L 45/741 709/203 |
| 2015/0207733 | A1* | 7/2015 | Richardson | H04L 61/1511 709/238 |
| 2017/0111309 | A1 | 4/2017 | Halley et al. | |
| 2019/0052595 | A1 | 2/2019 | Halley et al. | |

OTHER PUBLICATIONS

U.S. Appl. No. 14/883,261.
U.S. Appl. No. 16/102,947.
Transmittal letter MPEP 609, submitted with this SB08 form, May 13 2020, 1 page.

* cited by examiner

RESOLVER → AUTHORITY

AUTHORITY → RESOLVER

CLIENT SUBNET EFFICIENCY BY EQUIVALENCE CLASS AGGREGATION

FIELD

This disclosure relates generally to computer networks and more specifically to systems and methods for improving client subnet efficiency by equivalence class aggregation.

BACKGROUND

A Domain Name System (DNS) is a hierarchically distributed naming system that associates certain information, such as Internet Protocol (IP) addresses, with domain names assigned to each of participating entities. Specifically, the DNS resolves queries for the purpose of locating computer services or devices worldwide. For example, the DNS is widely used to translate human-friendly computer hostnames or domain names into IP addresses. Users take advantage of this when they recite meaningful Uniform Resource Locators (URLs) and e-mail addresses without having to know how the computer actually locates the services. In other words, the DNS is a hierarchical distributed database that associates typed data of many kinds with domain names.

DNS servers include recursive DNS servers and authoritative DNS servers. A recursive DNS server may answer a client query using a corresponding cache entry in its database. If the recursive server cannot answer the client query because the database does not contain the entry, it may recursively query authoritative DNS servers (proceeding from the root of the DNS tree down) until the answer is found. This is known as a recursive query or recursive lookup.

To improve customer experience in Content Delivery Networks (CDNs) and other situations, there is an extension to the DNS called client-subnet. This extension gives the authority information about the CIDR block of the querying client, and the response may also be associated with a CIDR block. This allows the answer to vary by CIDR block. A CIDR block is an \ Internet Protocol (IP) v4 or v6 address and a decimal number signifying the number of bits in the network portion of the address. The size of the routing prefix dictates the size of the subnet. For example, a CIDR block 192.168.100.0/22 represents the 1024 addresses from 192.168.100.0 to 192.168.103.255. In order to be efficient with respect to CPU, memory, and network bandwidth, the prefix lengths should be as small as possible, however this is often not practical in the real world due to the inability to effectively aggregate related blocks due to unrelated blocks being nearby in the address space.

For example, an ISP may have a very granular allocation policy. It may allocate /25 subnets (i.e. with 128 hosts on each) as follows:

London 10.0.0.0/25
Bermuda 10.0.0.128/25
London 10.0.1.0/25

The two London subnets are geographically and topologically similar and it would be beneficial to aggregate them into a bigger block. However, these subnets are not adjacent and therefore cannot be aggregated into a bigger subnet, such as a /24 or /23 without incidentally aggregating the Bermuda subnet that is not similar and should not be aggregated into the same subnet. This inability to usefully aggregate greatly increases the network, processing, and memory resources when using traditional client-subnet compared to not using it, and can be an operational problem for real-world servers.

Additionally, any aggregation without involvement of the Internet Service Provider (ISP) is bound to be suboptimal because knowledge of the network is essential to successful aggregation.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The technology disclosed herein is related to improving client subnet efficiency by equivalence class aggregation. In some example embodiments, a method for improving client subnet efficiency by equivalence class aggregation can include receiving a Domain Name System (DNS) query from a client, determining, based on predetermined class criteria, that the client is associated with an equivalency class, and resolving the DNS query using client subnet data associated with the equivalency class. The resolution of the DNS query can includes searching a cache associated with the equivalence class for an answer corresponding to the DNS query and, upon locating the answer, serving the answer to the client.

In some example embodiments, it can be determined that the client subnet data have changed and, in response to the determination, the cache flushed. The answer in the cache can expire after a predetermined period of time.

In some example embodiments, the method for improving client subnet efficiency by equivalence class aggregation can include searching a cache associated with the equivalence class for an answer corresponding to the DNS query, determining that the cache does not include the answer, based on the determination, querying, by a recursive server, an authoritative server using client subnet data associated with the equivalence class, receiving the answer from the authoritative server, storing the answer to the cache associated with the equivalency class, and serving the answer to the client.

In one embodiment of client subnet data, each equivalence class is assigned a representative CIDR block used to make queries on behalf of all clients associated with the equivalence class. The representative CIDR block includes a network and a net mask. For example, the representative CIDR block could be a /24 or /25 containing the least of the client addresses in the equivalence class. The representative CIDR block need not match any clients in the equivalence class. The representative CIDR block is sent when communicating with authorities via a client subnet option included in an OPT record, as specified by the Extension Mechanisms for DNS (EDNS0). The client subnet data can be added by a recursive server associated with an Internet Service Provider (ISP) of the client.

Equivalence classes are configured on the recursive server according to local policy and needs. Some examples of how to make an equivalence class are: a set of CIDR blocks, a geographical area, a network topology, an organization, a quality of service, and specific subscriber IDs. Determining whether the client is associated with the equivalence class can be based on identifying data associated with the client, for example its IPv4 or IPv6 address, or its subscriber id.

In some other example embodiments, a system for improving client subnet efficiency by equivalence class aggregation is provided. An example system can include at least one processor and a memory storing processor-executable codes, wherein the at least one processor is configured to receive a Domain Name System (DNS) query from a client, determine, based on predetermined class criteria, that the client is associated with an equivalency class, and resolve the DNS query using client subnet data associated with the equivalency class. Resolution of the DNS query can includes searching a cache associated with the equivalence class for an answer corresponding to the DNS query and, upon locating the answer, providing the answer to the client.

In some example embodiments, at least one processor of the system is further configured to determine that the client subnet data have changed and, in response to the determination, flush the cache.

In some example embodiments, at least one processor of the system is further configured to search a cache associated with the equivalence class for an answer corresponding to the DNS query, determine that the cache does not include the answer, based on the determination, query, by a recursive server, an authoritative server using client subnet data associated with the equivalence class, receive the answer from the authoritative server, store the answer to the cache associated with the equivalence class, and serve the answer to the client. The client subnet data can include a representative CIDR block used to make queries on behalf of all clients associated with the equivalence class.

In yet further example embodiments, a non-transitory processor-readable medium having instructions stored thereon, which when executed by one or more processors, cause the one or more processors to implement a method for improving client subnet efficiency by equivalence class aggregation is provided.

An example method for improving client subnet efficiency by equivalence class aggregation implemented by the one or more processors can include receiving a Domain Name System (DNS) query from a client, determining, based on predetermined class criteria, that the client is associated with an equivalency class, and resolving the DNS query using client subnet data associated with the equivalency class.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

Figure 1:
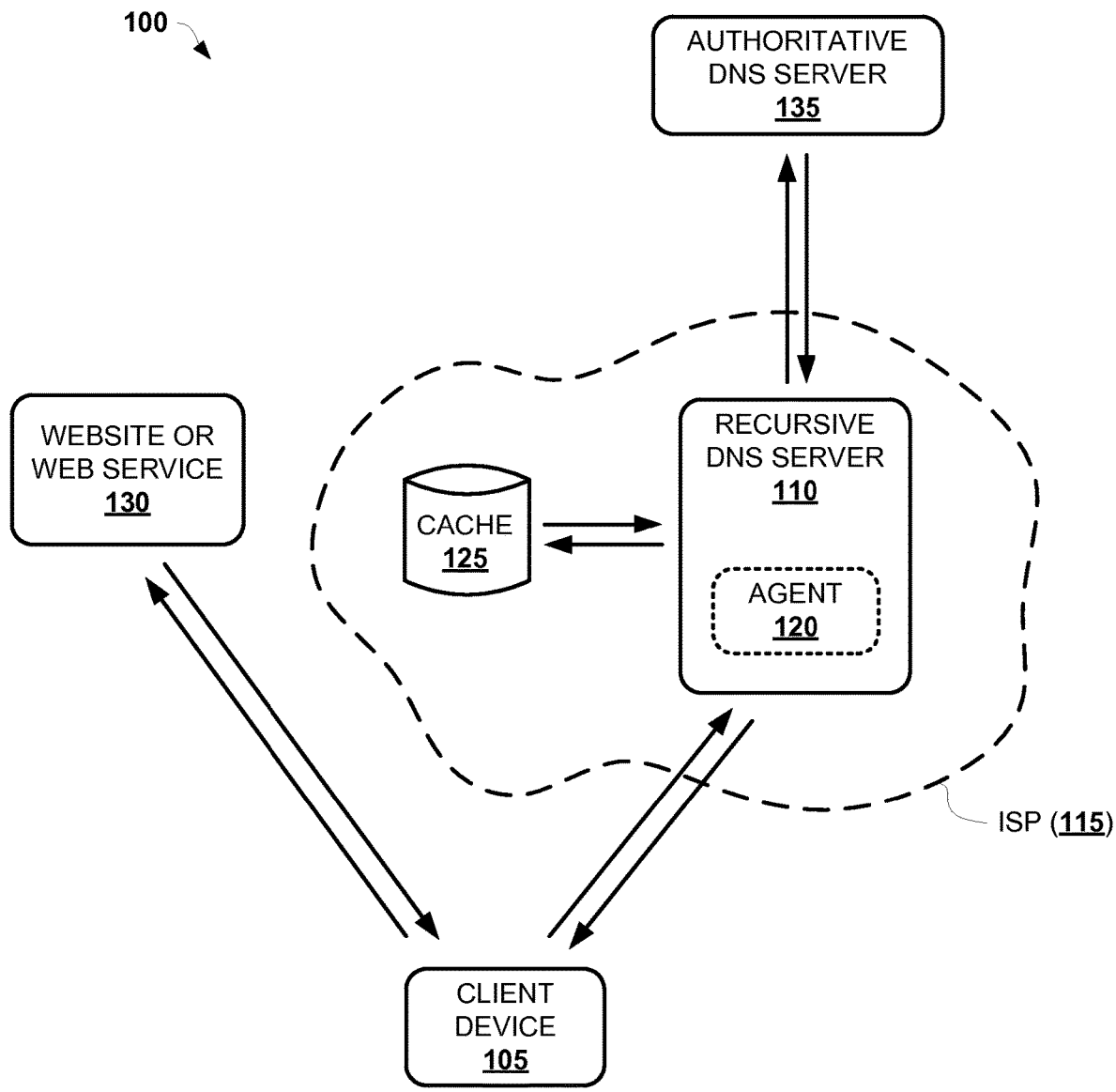
FIG. 1 is a block diagram of an example computer network environment suitable for implementing methods described herein.

The technology disclosed here is concerned with improving subnet efficiency by equivalence class aggregation. An example approach can involve aggregating clients into equivalence classes based on some criteria provided by an ISP and serving DNS queries more efficiently based on the aggregation. For every client in an equivalence class, the same DNS query should result in the same answer. The answers can be cached to avoid replication of information. In contrast to some existing solutions, the technology disclosed herein allows aggregating clients into equivalency classes based on criteria provided by an Internet Server Provider (ISP). Some existing solutions involve aggregating by CIDR blocks. Using the proposed technology, aggregation by CIDR blocks is possible as well but such CIDR blocks are specified by the ISP and do not have to be adjacent. In other examples, aggregation can be based on subscriber IDs. Each equivalence class can be assigned a representative CIDR block. The representative CIDR block can be used when making EDNS0 client-subnet queries on behalf of any of the clients in an equivalence class. The representative CIDR block associated with the equivalence class can be arbitrarily selected by the ISP to represent all members of the equivalence class.

The utility of this approach can be illustrated by the following example. An ISP, for example, may have 40 thousand client subnets in separate /25 CIDR blocks. However, for the reasons mentioned in the background section above, these client subnets cannot be meaningfully aggregated into blocks larger than /25 using existing approaches. Every time a query is answered, the answer is saved to a cache. Therefore, the answers to queries must be cached at /25 granularity, i.e. 40,000 times, even though there are significantly fewer than 40,000 distinct answers. This can create a huge impact in memory usage, CPU usage, and network bandwidth.

In contrast, the proposed technology allows aggregating arbitrary numbers of CIDR blocks with granularity of /25 into a single equivalence class. Thus, the same query from any member of the equivalence class needs to be resolved and cached once per equivalence class instead of once per CIDR block.

The meaningful aggregation of CIDR blocks can be based on criteria provided by an ISP because the ISP is aware of CIDR blocks making up a particular area. A representative CIDR block is used for all members of an equivalency class associated. Thus instead of aggregating the clients in the CIDR sense, the clients are aggregated in equivalence sense. It should be understood that building the equivalence class from a set of CIDR blocks is being used merely as an example and other aggregation methods can be used. For example, clients can be aggregated into an equivalence class based on a guaranteed quality of service using no CIDR blocks at all. In another example, clients can be aggregated based on subscriber IDs assigned by the ISP. For example, only those with premium service can be selected. The equivalence classes correspond to geographical or topological similarities between clients or subnetworks associated with the clients. However, it should be clear that the equivalence classes can be based on any other appropriate rules. Thus, criteria for aggregating clients into an equivalence class can be very flexible.

Thus, the same query from any client in an equivalence class should result in the same answer. If the answer is not in the cache, an answer returned by an authoritative server would be saved to cache to be used in the future if the same question is asked by any member of the equivalence class.

Furthermore, a representative CIDR block associated with the class may be any arbitrary block and may or may not enclose the IP address of any member of the class. In some embodiments, the representative CIDR block is selected according certain predetermined rules. For example, the representative CIDR block could be the /24 containing the least address (numerically lowest) of the client addresses in the equivalence class. Furthermore, clients associated with the equivalence class do not have to be independently addressable and could, for example, be located on a private subnet with private addresses. However, the representative CIDR block can be a public address.

Thus, if an answer is in the cache associated with an equivalence class, the answer will be provided. The total number of caches may be one, or one per equivalence class, or some number in between. A cache, for example, can be shared by more than one equivalence class if there is a mechanism of searching the cache that restricts answers to the appropriate equivalence class. If the cache has an answer for the question, the answer can be used for any member of the equivalence class. If the answer is not found in the cache, the DNS query process proceeds normally except that the representative CIDR block of the equivalence class is added to the query. The representative CIDR block can be passed using a client subnet option included in an OPT record, as specified by the Extension Mechanisms for DNS (EDNS0). EDNS0 provides for passing optional data in DNS requests. Specifically, an EDNS client subnet option can be used to pass a network address (network and prefix length). Thus, the client subnet information including the representative CIDR block can be added to the client query by the ISP and sent to the authoritative server.

Once the answer is received, the answer is cached and associated with the equivalence class. If a different client in the same equivalence class subsequently makes the same query, the answer will be found in the cache and served without having to go through the normal DNS resolution process.

If a client from a different equivalence class submits a DNS query, a cache associated with the different equivalence class will be searched. It should be understood that different equivalence classes are not necessarily associated with different caches. For example, a single cache can be shared by different equivalence classes using appropriate equivalence class tagging.

If the answer is not in the cache, an authoritative server will be queried using a different representative CIDR block. An answer in the cache may be associated with a Time to Live (TTL) value, which can be low for popular websites. If the representative CIDR block changes, previously cached entries associated with the old representative CIDR block would no longer be used.

The following description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following is, therefore, not to be taken in a limiting sense and the scope is defined by the appended claims and their equivalents. Also, in this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

FIG. 1 is a block diagram of an example computer network environment 100 suitable for practicing the methods for improving client subnet efficiency by equivalence class aggregation as described herein. It should be noted, however, that the environment 100 is just one example embodiment provided for illustrative purposes and reasonable deviations of this embodiment are possible.

As shown in the figure, there is provided a client device 105 (also referred herein to as "client" for simplicity). The client device 105 is generally any appropriate computing device having network functionalities allowing communicating under any existing IP protocols. Some examples of the client devices 105 include, but are not limited to, a computer (e.g., laptop computer, tablet computer, desktop computer), cellular phone, smart phone, gaming console, multimedia system, smart television device, set-top box, infotainment system, in-vehicle computing device, informational kiosk, robot, smart home computer, and so forth. The environment may include multiple client devices 105, but these are not shown for ease of understanding.

The client device 105 can be operated by a user who can make certain inquires, such as a request to open a website in a browser, download a file from the Internet, access a web service via a software application, and so forth. The client query may include a domain name or a host name (e.g., in the form of "www.nominum.com"), which requires resolution of the domain name to an IP address. In certain embodiments, a recursive server making inquiries on behalf of the client may include additional data, such as, for example, client-subnet data. Some examples of the client-subnet data can include a representative CIDR block associated with a client subnet or any other information that can be passed using EDNS0 options.

The client query initiated by the client device 105 can be transmitted to a recursive DNS server 110 (also commonly referred to as a "DNS resolver"), which can be associated with a local ISP 115. The recursive DNS server 110 may include an agent 120 configured to implement at least some steps of the methods for improving client subnet efficiency by equivalence class aggregation described herein. The agent 120 may be a software module or an application installed on the recursive DNS server 110, such that it is an integrated part of recursive DNS server 110. Thus, the agent 120 can perform certain operations which attributed to the recursive DNS server 110. Alternatively, the agent 120 can be a stand-alone computing device operatively coupled to the recursive DNS server 110 and facilitating DNS resolution process. In yet other embodiments, some steps of the methods discussed herein can be performed by the agent 120 and some other steps of these methods can be performed by the recursive DNS server 110.

When the recursive DNS server 110 receives a client query, the agent 120 can determine an equivalence class for the client 105 based on some client identifying data. Clients can be aggregated in into equivalence classes based on some predetermined criteria. In some embodiments, clients can be classified based on a geographical location of one or more clients 105. In other embodiments, the clients are classified based on particular network topologies of one or more clients 105. In some embodiments, the clients are classified based on the nature of business or a type of business. In yet further embodiments, equivalence classes can be based on any other rule or principle specifying locations of clients or any groups of clients. In certain example embodiments, clients can be aggregated into classes based on a set of rules, for example, equivalence classes can be created based on a combination of criteria including two or more of the following: geographical locations of clients, the nature of business of clients, network topologies associated with the clients, and a website or web service associated with the clients. As was already mentioned above, the clients in equivalence classes are not required to have individual globally routable addresses.

The agent 120 can select one of caches 125, which is associated with the equivalence class and perform a look-up operation to locate an answer (e.g., previously received answer), which corresponds to the client query. When searching the cache 125, a representative CIDR block (IPv4 or IPv6, depending on the address family of the querying client) of the equivalence class can be used. If the agent 120 is able to locate the answer in the cache 125, this answer is delivered back to the client 105. In this case, the answer can includes a network address corresponding to the client query so that the client 105 can be subsequently routed to a website or web service 130 associated with the client query.

However, if the agent 120 is not able to locate the answer in the cache 125, the agent can query one or more authoritative DNS servers 135. This query can include client subnet data associated with the equivalence class. The client subnet data can include the representative CIDR block associated with the equivalence class of the client. In response, the authoritative DNS server 135 can generate and send back the answer to the agent 120. This answer can include the network address corresponding to the client query so that the client 105 can be subsequently routed to a website or web service 130 associated with the client query.

Furthermore, in this scenario, the response can be cached in the cache 125 in such a way that any further client queries from other members of the same equivalence class can be matched to the answer. According to some embodiments, the representative CIDR block can be the least routable address of client addresses in the equivalence class.

Still referring to FIG. 1, it shall be noted that the recursive DNS server 110 can be associated with multiple caches 125. In certain embodiments, there can be provided one cache 125 per equivalence class. In yet more embodiments, each equivalence class may be associated with more than one cache.

In some embodiments, cache entries stored in the cache 125 can be tagged or labeled with a unique identifier associated to a corresponding equivalence class. For example, when an answer is stored in a cache, a unique identifier can be assigned to the answer to designate an equivalence class to which it belongs. Additionally, the tagging procedure can facilitate searching for cached answers associated with equivalence classes and improve operations of the recursive server 110. Moreover, in some example embodiments, the method disclosed herein can provide for provisioning membership of clients in equivalence classes.

According to yet additional embodiments of this disclosure, memberships in equivalence classes can be adjusted, tuned, or otherwise modified based upon one or more criteria or rules. The adjustment of memberships may be a necessary step in response to changing network conditions which periodically occur. Accordingly, a membership in one or more equivalence classes can be adjusted based on determining any changes in service (e.g., changes in bandwidth, quality of service, client location, and so forth). In yet additional embodiments, a membership in one or more equivalence classes can be adjusted based on detection of a modification to the network topology. In yet additional embodiments, a membership in one or more equivalence classes can be adjusted based on received input concerning performance of any suitable client subnet customized service.

Figure 2:
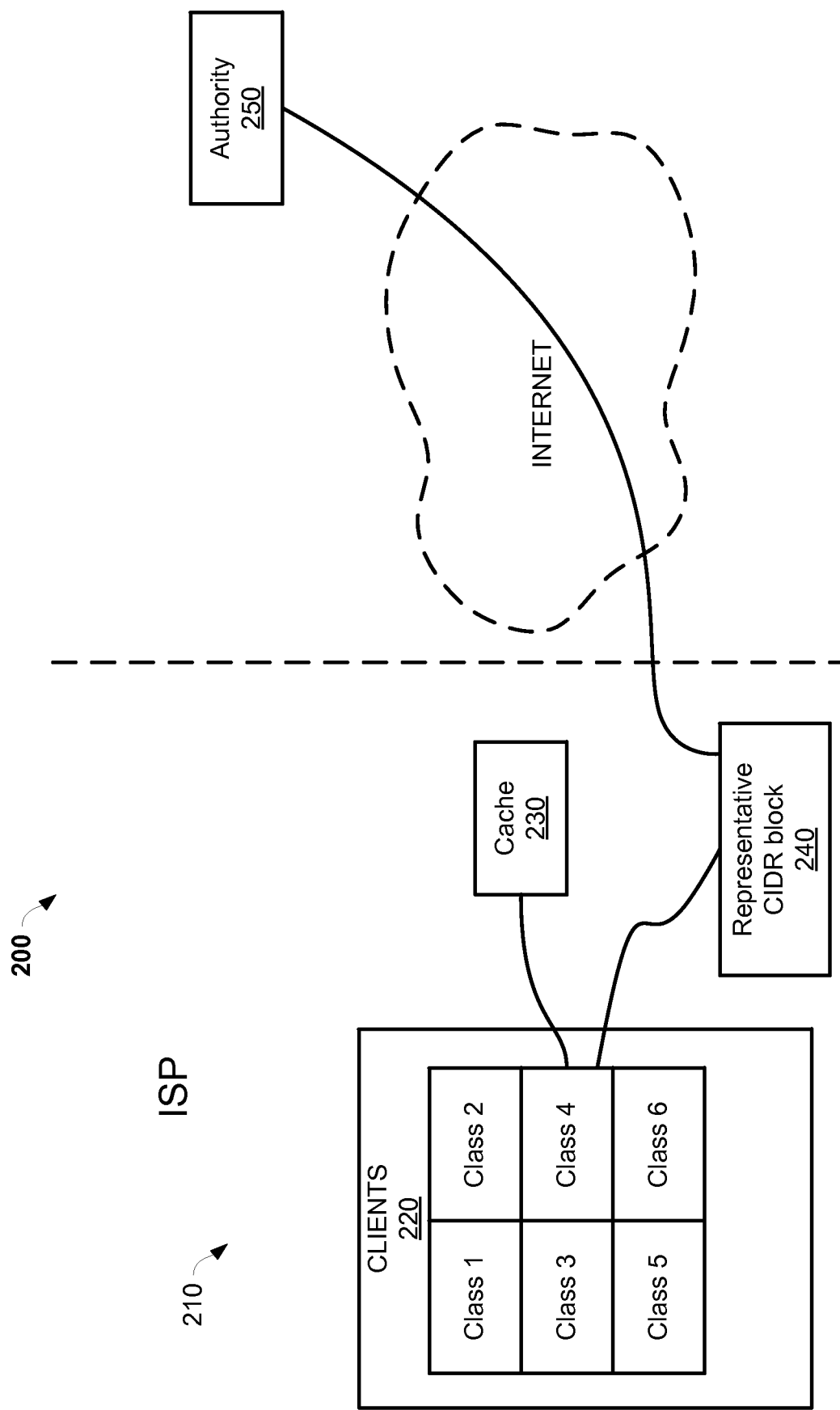
FIG. 2 is a block diagram illustrating a system for improving client subnet efficiency by equivalence class aggregation, according to some example embodiments.

FIG. 2 is a block diagram illustrating a system for improving client subnet efficiency by equivalence class aggregation, according to some example embodiments. As shown in the figure, an ISP 210 can aggregate clients 220 into equivalence classes 1, 2, 3, 4, 5, and 6 based on some predetermined criteria provided by the ISP 210. For example, the aggregations can be performed based on Classless Inter-Domain Routing (CIDR) blocks, a geographical area, a network topology, an organization, a quality of service, and specific subscriber IDs. When a DNS query is received from a client, it can be determined, based on these criteria which equivalence class the client belongs to. For example, the client can be determined to belong to an equivalency class based a client identifier. In the figure, the client belongs to equivalence class 4. The DNS query is then resolved according to resolution rules associated with the class. The equivalence class can be represented by a representative CIDR block 240. The representative CIDR block can be part the client subnet data added to the DNS query if a recursive server associated with the ISP 210 needs to query authority 250.

The resolution of the DNS query may include searching a cache 230 associated with class 4 for an answer corresponding to the DNS query. If the answer is found in cache 230, the answer is served back to the client. If, on the other hand, the answer is not found in cache 230, the recursive server can query authority 250. The recursive server associated with ISP 210 may add client subnet data associated with the equivalence class to the query. The client subnet data may be provided using a client subnet option associated with EDNS0.

The client subnet data can include the representative CIDR block 240 which is used to make queries on behalf of all clients associated with the equivalence class 4. The representative CIDR block 240 includes a source address and either a netmask or a prefix length. As already mentioned above, the representative CIDR block 240 can be chosen arbitrarily, for example, the representative CIDR block 240 may be the least of client addresses in the equivalence class. Once the answer is received from the authority 250, the answer is stored to the cache 230 associated with the equivalence class 4, and served to the client.

In some example embodiments, cache 230 can be flushed if it is determined that the client subnet data have changed. Additionally, the answer in the cache 230 can expire after a predetermined period of time. This predetermined period of time can vary but, in generally, is smaller for more popular destinations.

Figure 3:
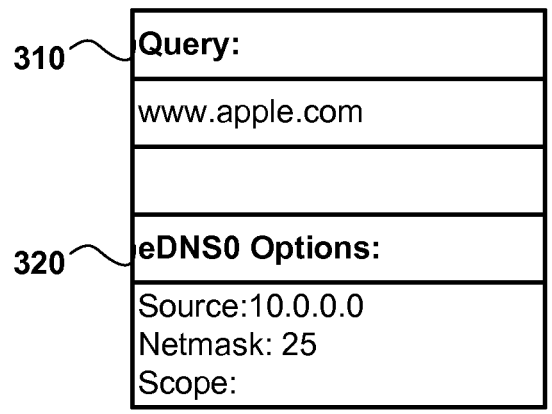
FIG. 3 is a block diagram illustrating components of a query and an answer, according to some example embodiments.
Figure 3:
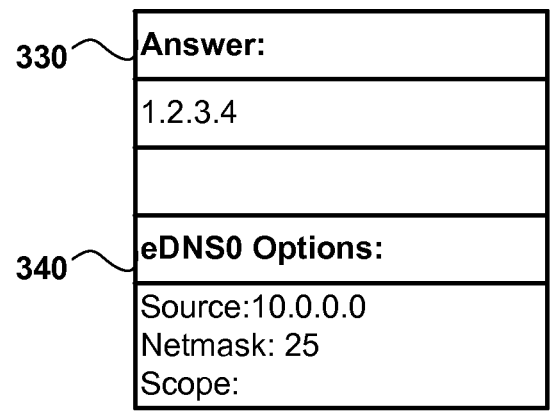

FIG. 3 is a block diagram illustrating components of a query and an answer, according to some example embodiments. As mentioned above, if the answer is not found in cache 230, the recursive server (also referred to as a resolver) can query authority 250. As shown in the figure, a query 310 can include a domain name and EDNS0 options 320. The EDNS0 options 320 can be added by the recursive server associated with ISP 210 may. The EDNS0 options 320 can include the representative CIDR block. The representative CIDR block 240 includes a source address, and either a netmask or a prefix length. The authority 230 may respond with an answer 330. The answer may include a network address corresponding to the query.

Figure 4:
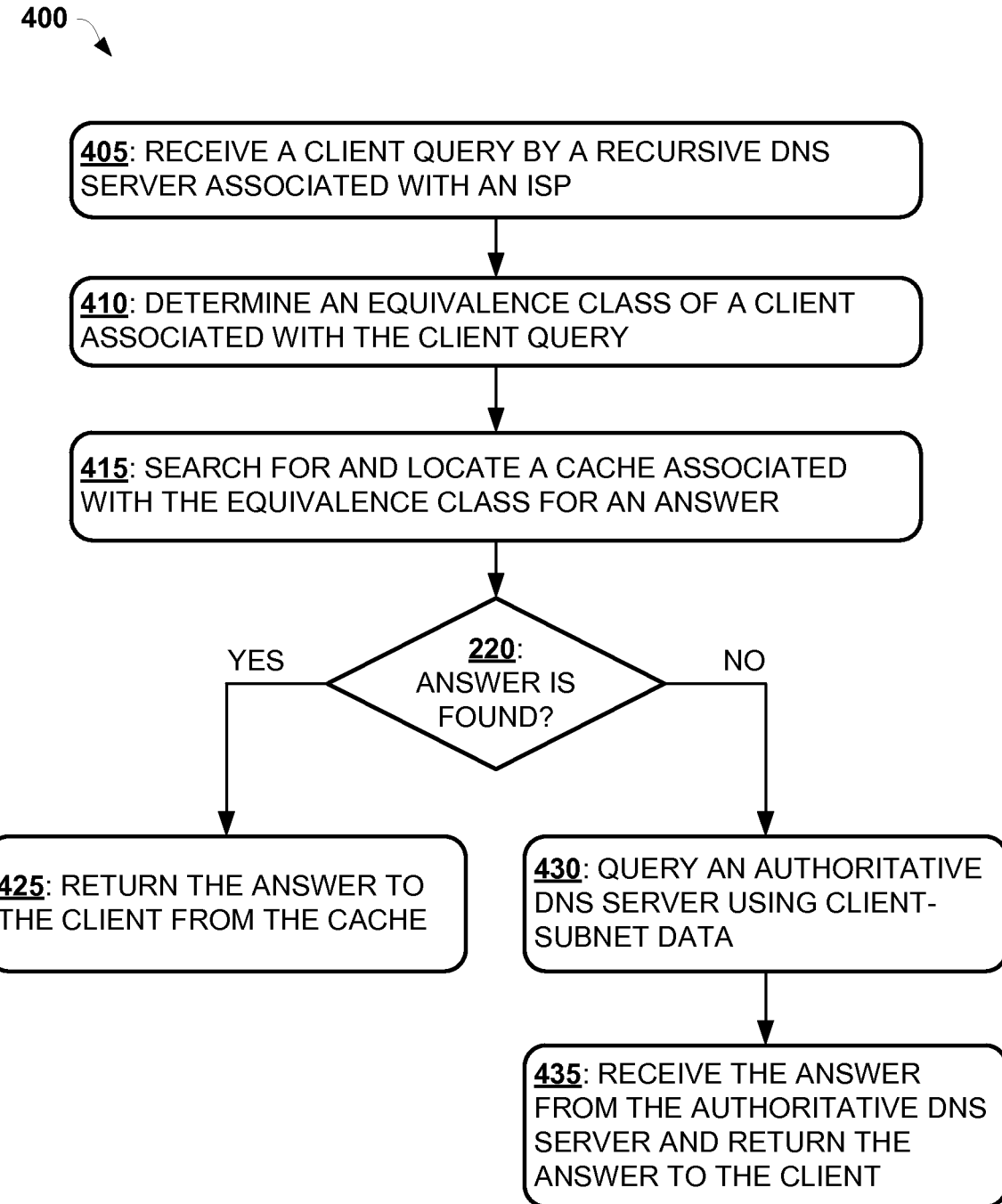
FIG. 4 is a flow chart of a method for improving client subnet efficiency by equivalence class aggregation, according to some example embodiments.

FIG. 4 is a flow chart of a method 400 for improving client subnet efficiency by equivalence class aggregation, according to some example embodiments. The method 400 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the agent 120 or the recursive DNS server 110 described above with reference to FIG. 1. Notably, the steps recited below may be implemented in an order different than described and shown in the figure. Moreover, the method 400 may have additional steps not shown herein, but which can be evident for those skilled in the art from the present disclosure. The method 400 may also have fewer steps than outlined below and shown in FIG. 4.

The method for improving client subnet efficiency by equivalence class aggregation 400 may commence at operation 405 with a recursive DNS server 110 associated with a particular ISP 115 receiving a client query from a client 105. The client query includes a domain name, class and type which needs to be resolved.

At operation 410, an agent 120 (or the recursive DNS server 110) determines an equivalence class associated with the client 105. The determination can be based criteria provided by the ISP associated with the client, which in turn can be based, on certain CIDR blocks to which the client belongs, location of the client, network topology, the nature of client's business, and so forth. At operation 415, the agent 120 (or the recursive DNS server 110) can search for and locate a cached answer to the client query in one or more caches 125 associated with the determine equivalence class. The cached answer may be a network address, such as an IP address, or any other DNS data associated with the domain name, class, and type requested in the client query.

At operation 420, the agent 120 (or the recursive DNS server 110) makes determines whether an appropriate answer to the client query is found in the cache 105. If the answer is found, at operation 425, the agent 120 (or the recursive DNS server 110) selectively returns the answer to the client query to the client. Otherwise, if the answer is not found, at operation 430, the agent 120 (or the recursive DNS server 110) queries an authoritative DNS server 135 using the client-subnet data of the client query. The client-subnet data can include a representative CIDR block of the equivalence class associated with the client. At operation 435, the agent 120 (or the recursive DNS server 110) can receive the answer from the authoritative DNS server 135 and selectively return the answer to the client.

Figure 5:
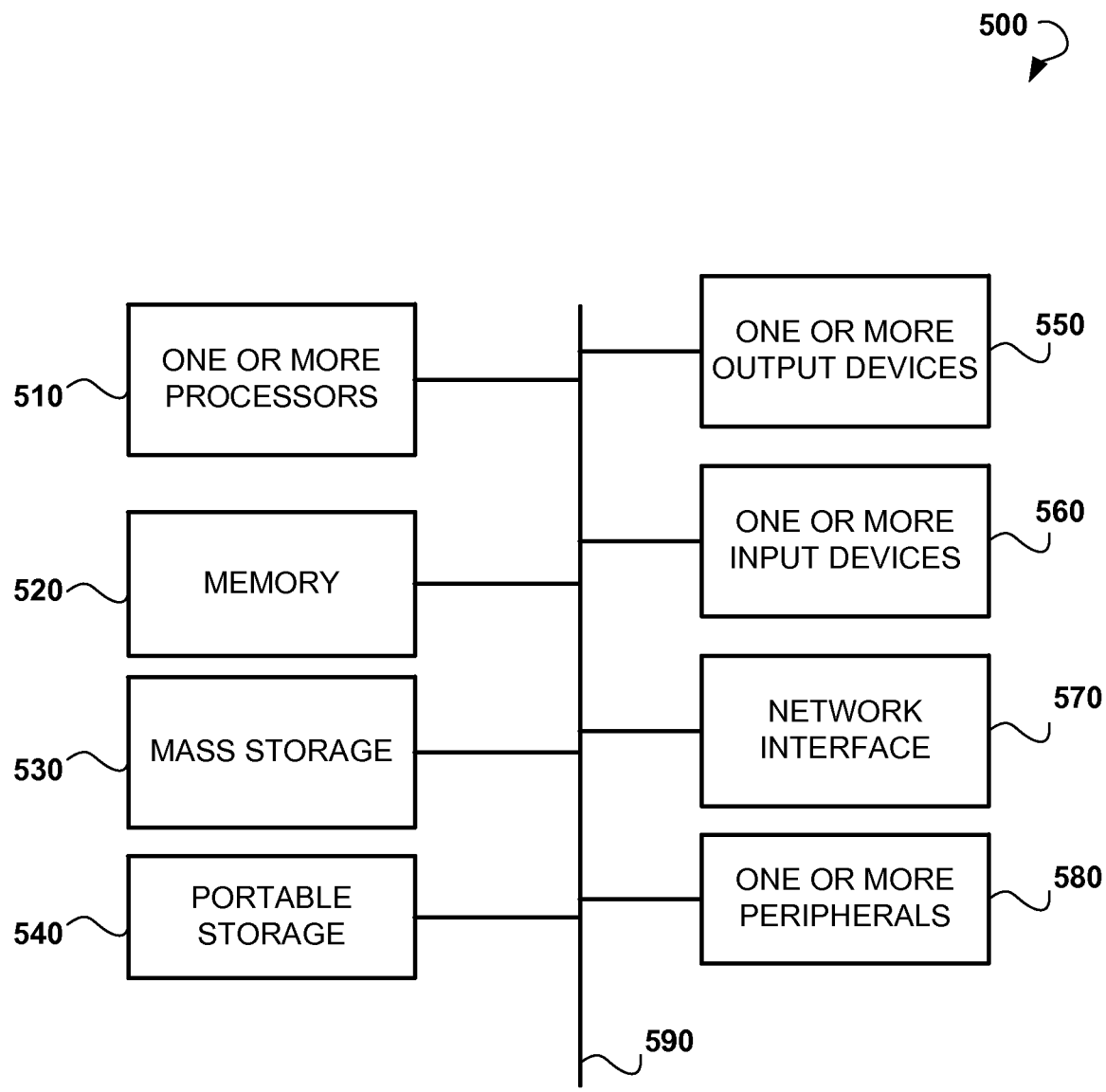
FIG. 5 is a computer system that can be used to implement the methods for improving client subnet efficiency by equivalence class aggregation, according to some example embodiments.

FIG. 5 illustrates an exemplary computing system 500 that may be used to implement embodiments described herein. System 500 of may be implemented in the contexts of the likes of client device 105, the recursive DNS server 110, and the agent 120. The computing system 500 of FIG. 5 may include one or more processors 510 and memory 520. Memory 520 stores, in part, instructions and data for execution by processor 510. Memory 520 can store the executable code when the system 500 is in operation. The system 500 of FIG. 5 may further include a mass storage device 530, portable storage medium drive(s) 540, one or more output devices 550, one or more input devices 560, a network interface 570, and one or more peripheral devices 580.

The components shown in FIG. 5 are depicted as being connected via a single bus 590. The components may be connected through one or more data transport means. Processor 510 and memory 520 may be connected via a local microprocessor bus, and the mass storage device 530, peripheral device(s) 580, portable storage device 540, and network interface 570 may be connected via one or more input/output (I/O) buses.

Mass storage device 530, which may be implemented with a magnetic disk drive or an optical disk drive, is a non-volatile storage device for storing data and instructions for use by a magnetic disk or an optical disk drive, which in turn may be used by processor 510. Mass storage device 530 can store the system software for implementing embodiments described herein for purposes of loading that software into memory 520.

Portable storage medium drive(s) 540 operates in conjunction with a portable non-volatile storage medium, such as a compact disk (CD) or digital video disc (DVD), to input and output data and code to and from the computer system 500 of FIG. 5. The system software for implementing embodiments described herein may be stored on such a portable medium and input to the computer system 500 via the portable storage medium drive(s) 540.

Input devices 560 provide a portion of a user interface. Input devices 560 may include an alphanumeric keypad, such as a keyboard, for inputting alphanumeric and other information, or a pointing device, such as a mouse, a trackball, a stylus, or cursor direction keys. Additionally, the system 500 as shown in FIG. 5 includes output devices 550. Suitable output devices include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus (USB).

Peripherals 580 may include any type of computer support device to add additional functionality to the computer system. Peripheral device(s) 380 may include a modem or a router.

The components contained in the computer system 500 of FIG. 5 are those typically found in computer systems that may be suitable for use with embodiments described herein and are intended to represent a broad category of such computer components that are well known in the art. Thus, the computer system 500 of FIG. 5 can be a personal computer (PC), hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, methods and systems for improving client subnet efficiency by equivalence class aggregation have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method operable at a domain name system (DNS) resolver, the method comprising:
receiving a provisioning of memberships of clients in equivalence classes;
over time, adjusting the memberships of clients in the equivalence classes, based at least in part on changes to at least one of: network conditions, bandwidth, quality of service, client location, network topology, and, performance;
in response to a DNS query from a client, determining that the client is a member of a particular equivalence class in the equivalence classes, the determination based at least in part on the memberships in effect at the time when the DNS query occurs; and,
resolving the DNS query based at least in part on the determined membership of the client in the particular equivalence class.

2. The method of claim 1, wherein resolving the DNS query includes:
searching a cache associated with the particular equivalence class for an answer corresponding to the DNS query; and, upon locating the answer, serving the answer to the client.

3. The method of claim 1, wherein the adjustment of the memberships of the clients in the equivalence classes is based at least in part on changes to at least one of:
network conditions, and network topology.

4. A domain name system (DNS) system comprising one or more hardware processors and memory storing instructions for execution on one more processors, the DNS system providing DNS resolution services and comprising:
a first subsystem that receives a provisioning of memberships of clients in equivalence classes;
a second subsystem that, over time, adjusts the memberships of clients in the equivalence classes, based at least in part on changes to at least one of: network conditions, bandwidth, quality of service, client location, network topology, and, performance;
a third subsystem that, in response to a DNS query from a client, determines that the client is a member of a particular equivalence class in the equivalence classes, the determination based at least in part on the memberships in effect when the DNS query occurs; and,
a fourth subsystem that resolves the DNS query based at least in part on the determined membership of the client in the particular equivalence class.

5. The DNS system of claim 4, wherein resolving the DNS query includes: searching a cache associated with the particular equivalence class for an answer corrsponding to the DNS query; and, upon locating the answer, serving the answer to the client.

6. The DNS system of claim 4, wherein the adjustment of the memberships of the clients in the equivalence classes is based at least in part on changes to at least one of: network conditions, and network topology.

7. A non-transitory processor-readable medium having instructions stored thereon for execution on one more processors to provide a DNS resolver, the instructions further comprising instructions to:
receive a provisioning of memberships of clients in equivalence classes;
over time, adjust the memberships of clients in the equivalence classes, based at least in part on changes to at least one of: network conditions, bandwidth, quality of service, client location, network topology, and, performance;
in response to a DNS query from a client, determine that the client is a member of a particular equivalence class in the equivalence classes, the determination based at least in part on the memberships in effect when the DNS query occurs; and, resolve the DNS query based at least in part on the determined membership of the client in the particular equivalence class.

8. The non-transitory processor-readable medium of claim 7, wherein resolving the DNS query includes: searching a cache associated with the particular equivalence class for an answer corresponding to the DNS query; and, upon locating the answer, serving the answer to the client.

9. The non-transitory processor-readable medium of claim 7, wherein the adjustment of the memberships of the clients in the equivalence classes is based at least in part on changes to at least one of: network conditions, and network topology.

* * * * *